2 Sheets—Sheet 1.

W. GATES.
ELECTRIC FIRE-ALARM.

No. 174,070.  Patented Feb. 29, 1876.

Witnesses.
A. M. Edwards
William B. Phair

Inventor
Wm Gates
per James A. Whitney
Atty

N. PETERS, PHOTO-LITHOGRAPHER, WASHINGTON, D C.

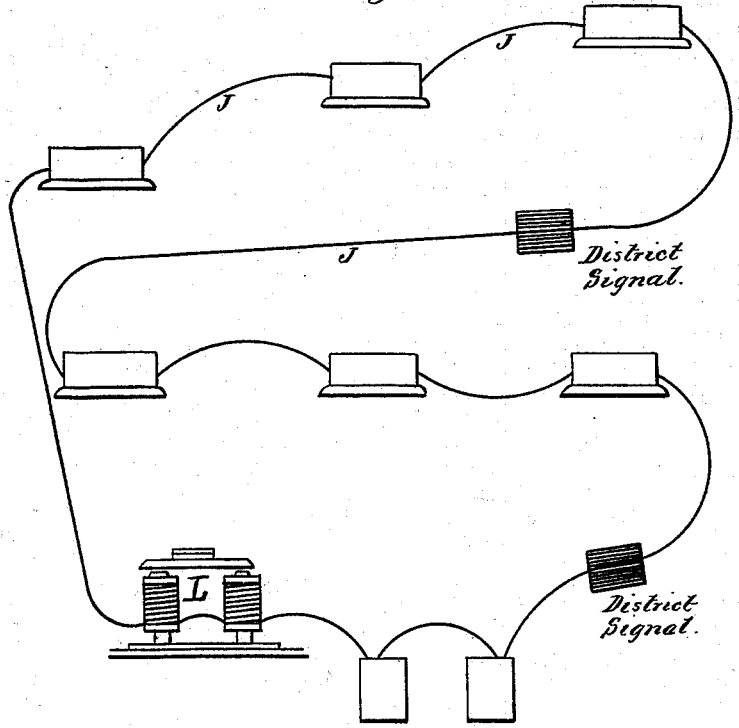

UNITED STATES PATENT OFFICE.

WILLIAM GATES, OF NEW HAVEN, CONNECTICUT.

IMPROVEMENT IN ELECTRIC FIRE-ALARMS.

Specification forming part of Letters Patent No. 174,070, dated February 29, 1876; application filed April 1, 1874.

*To all whom it may concern:*

Be it known that I, WILLIAM GATES, of New Haven, in the county of New Haven and State of Connecticut, have invented certain Improvements in Electric Fire-Alarms, of which the following is a specification:

This invention relates to the construction of a device which, when a certain predetermined heat shall have been attained, will automatically open and close an electric circuit communicating through connecting-wire to an annunciator, giving an alarm and indicating the point where such heat exists; and the invention consists in the arrangement of a plate, formed from metal or other material susceptible to expansion by heat, in a rigid frame, so that the expansion will cause the center to be thrown outward or inward, as the case may be, and a stud arranged in connection with this plate, which is moved axially by the expansion of the said plate, and by such movement trips a vibrating lever, which at each vibration makes and breaks the electric circuit, the number of vibrations being previously determined, so that the making and breaking of the circuit with the annunciator will indicate the position of the instrument where such action occurred, all as more fully hereinafter described. The invention further comprises certain novel combinations of parts, whereby the most effective operation of the apparatus in the manner just indicated is secured.

Figure 1:
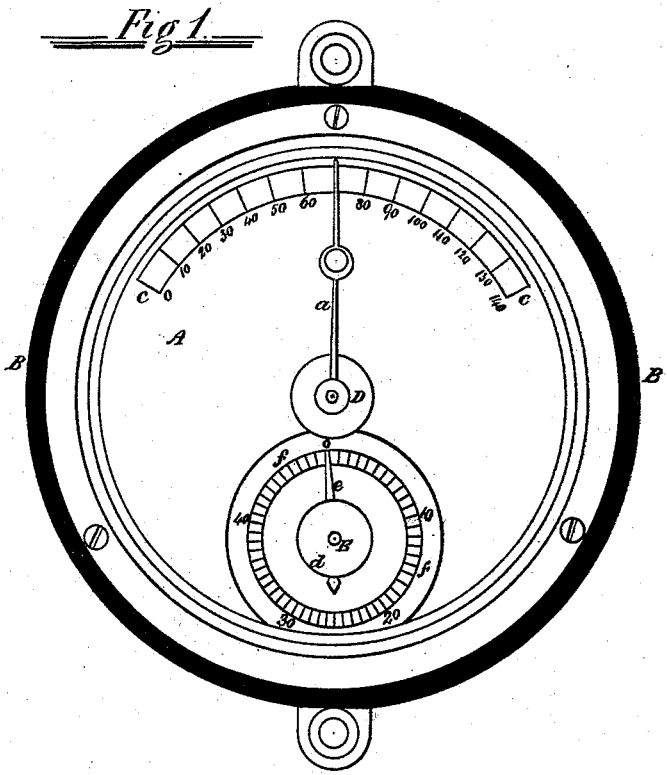
Figure 2:
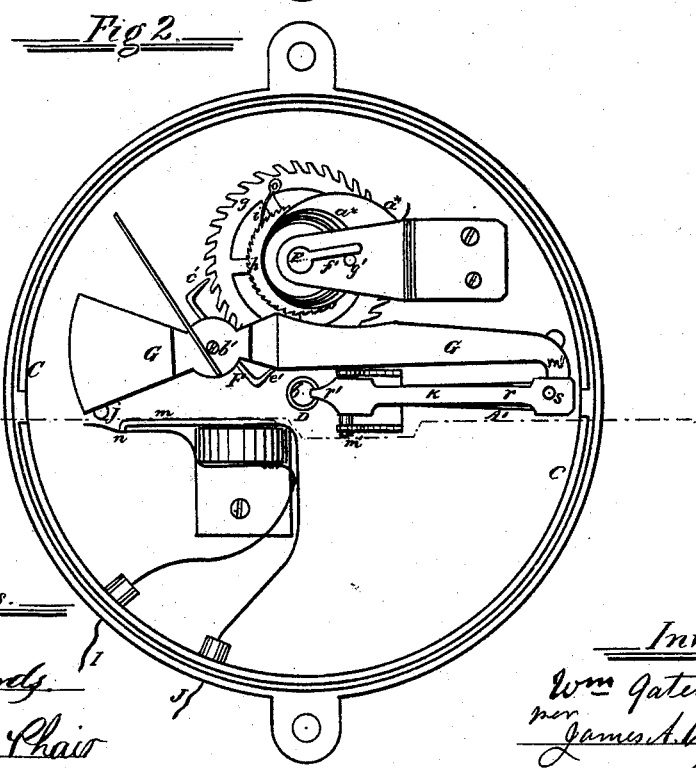

Figure 1 is a plan view of an apparatus constructed according to my invention. Fig. 2 is an inverted plan view of the same. Fig. 3 is a vertical sectional view of the same, taken in the line &c. &c. of Fig. 2. Fig. 4 represents the arrangement of several of the apparatus upon a normally-closed circuit or electric circuit, whereby the said wire is enabled to transmit signals from any one of several localities to a central alarm or annunciating device.

In this my invention a thermometric device or apparatus, actuated by the expansion of metal or other material by heat, is so connected with a clock-work mechanism and with a normally-closed electric circuit that the action of the thermometric device, when a certain predetermined temperature is reached, will start the clock-work, to intermittently break the circuit, which, being connected to or with a suitable annunciating device or signaling device, so that the latter will indicate or give a signal corresponding to the number of times the circuit is closed or broken, so that different instruments at different localities along the wire or electric circuit may be set for different numbers, and each in causing an alarm will indicate its own position by the corresponding number indicated by or from the annunciating device.

The construction and operation of the apparatus, as represented in the drawings, is as follows, it being kept in mind that various modifications may be made in the mechanism, as thus described, without evading or avoiding the principle of my invention:

A is a plate or disk of brass or other material, capable of a considerable degree of expansion when acted upon by an elevation of temperature. This expansion-plate is made concavo-convex, with, preferably, its convex side uppermost. It has its periphery firmly fitted within a frame, base, or support, B, which may be of iron or other material, having a considerable lower ratio of expansion for any given increase of temperature than has the expansion-plate A. It will be seen that the latter, being rigidly confined at its periphery, will, when expanded by heat, bulge upward and give a corresponding movement to parts immediately attached thereto. The case B is fixed upon the shell C provided underneath, and within which are arranged those of the working parts of the apparatus necessarily adjacent to the plate A. Provided at or near the center of the plate A is a vertical arbor, D, carrying at its upper extremity, above the plate A, a pointer, *a*, and its lower end, below the said plate, forming a horizontal cam, *b*. Arranged upon the upper surface of the plate A, in appropriate relation to the pointer *a*, is a scale, *c*, the purpose of which will hereinafter appear.

At or near the edge of the plate A is an arbor, E, the bearing of which should be in the top *a'* of the shell C, and which has at its upper extremity a button, *d*, whereby it may be turned, and also an index-finger, *e*, designed for use in connection with an annular scale,

*f*, provided upon the upper surface of the plate A and concentric with the arbor E. This arbor receives the requisite rotary movement by means of a spring, *a**, acting to turn the arbor when released, (the spring being, of course, previously wound,) and to vibrate the lever in a manner substantially the same as the operation of the hammer of an ordinary alarm-clock. That portion of the arbor E within the shell C (see the inverted plan view, Fig. 2) is provided with an escapement, comprising the escape and wheel *g*, loose upon the arbor, the ratchet-wheel *h*, fixed to the arbor and connected with the escape-wheel, in order to give motion thereto, by the pawl *i* on the latter, the spring *a**, operating to rotate the arbor on occasion, as aforesaid, and the anchor F. This anchor F is affixed to a lever, G, which is pivoted at *b*. The pallets *c' e'* of the anchor play between the teeth of the escape-wheel in such wise as to lock the said wheel against rotation when the lever G is stationary in a certain position; but when such lever is released from such position to enable the rotary motion of the escape-wheel to communicate through its teeth a vibratory motion to the lever G, the number of vibrations thus given to the aforesaid lever correspond to the number of teeth permitted, at any one operation of the escape-wheel, to impinge upon or against the pallets of the anchor. Upon the lower end of the arbor E is an arm, *f'*, which, on coming in contact with a fixed stop, *g'*, (on the fixture which forms the bearing for the said lower end of the arbor E,) limits the movement in one direction of the aforesaid arbor E. Of course any other suitable clock-work mechanism may be substituted in place of that just described, when desired.

I and J are sections of an electric wire, (or wire connected with a suitable battery,) which pass through insulations arranged in the sides of the shell C, and terminate the one in a rigid metallic bar, *m*, the other in an elastic strip, *n*, the tension of the latter tending to bring it in contact with the former to connect the two, and thereby close the circuit through the wire.

It must be particularly kept in mind that this wire (or series of wire sections connecting to provide a single circuit) is single in character, that it is passed to or through two or more or any desired number of rooms, buildings, or different localities, and that at or in each of said rooms, buildings, or localities, as the case may be, the wire is separated, but furnished with points or surfaces of contact, provided by a bar, *m*, and strip *n*, or equivalent means, and with a thermometric device furnished with suitable mechanical appliances for automatically breaking the circuit on the occurrence of an undue rise in temperature. By this means the necessity of a separate wire for each room or separate locality is obviated, and the wire sections joining after the transmission of an alarm-signal from any one of the different localities, the entire apparatus retains its normal condition for the transmission of signals from the other localities.

That end of the lever G adjacent to the bar *m* and strip *n* is provided with a stud, *j*, of wood or other non-conducting material, which, when the said end of the lever is moved toward the strip, forces the latter away from the bar *m*, and thereby breaks the circuit, the reverse movement of the said lever (due to the elastic pressure of the strip *n* thereon) permitting the contact of the strip with the bar to connect the two sections of the wire, and thereby close the circuit.

K is a lever, pivoted on a horizontal point, *m*, with its long arm *r* pressed downward by a spring, A', to keep its short arm against the cam *b*, formed on or by the lower end or surface of the arbor D, and its long arm *r* furnished with an upwardly-projecting stud, *s*, so arranged that when the aforesaid long arm *r* of the lever K is raised beyond a certain point the arm *m''* of the lever G will bear against the said stud *s*, and the lever G be thereby held fast with the pallets of the anchor F, locking fast the escape-wheel *g*. The position of the stud *s* with reference to the just-specified end of the lever G is regulated by turning the arbor D, the cam *b* raising or lowering the long arm *r* of the lever K by its action on the short arm *r'* of the latter, and the position of the cam itself being regulated by that of the pointer *a* with reference to the scale *c*, which is graduated to different degrees of temperature over and above any ordinary atmospheric warmth. The parts must be so proportioned with reference to each other, and to the degree of expansion of the plate A from any stated increase of temperature, that when the bulging of the plate from the just-mentioned expansion thereof has lifted the arbor D to a certain extent, thereby permitting the spring to force downward the long arm of the lever K, thereby bringing the stud *s* away from the adjacent end of the lever G. This releases the escape-wheel from the locking action of the anchor, whereupon the said escape-wheel rotates until the arm *f* strikes the stop *g'* and arrests its motion. This movement causes a desired number of the teeth of the escapement-wheel to give a corresponding number of vibrations to the lever G, thereby breaking and closing the connection of the wires, and consequently of the circuit therethrough, an equal number of times. Inasmuch as the wire connects with a suitable annunciating device, (indicated at L in Fig. 4, and which may be of any kind known to and approved by telegraphers for similar purposes,) the signals given by said annunciating device correspond to the vibrations of the lever G, and accurately indicate which of the series of thermometrical devices has caused the alarm, and consequently the locality of the same.

The number of teeth on the escape-wheel which, in any given case, shall act on the anchor F to give the alarm is proportioned to the distance (at starting the alarm) of the arm $f'$ from the stud $g'$, which finally stops the same, and this is adjusted at pleasure by bringing the index-finger $e$ to any desired point on the scale $f$, the graduating-lines of which correspond to the number of teeth on the escape-wheel.

It will be observed that different instruments (actuated by a thermometric device) may be arranged at different points, and set for different numbers, and such, in case of alarm, will indicate its own position. Therefore, the pointer $a$ of each thermometric device being set at that point of the scale $c$ indicating the temperature upon the occurrence of which the making of the warning signal is desired, and the index-finger $e$ being adjusted to that point of the scale $f$ indicating the number of times the circuit is to be closed and broken to give the desired signal, and this number of times (of breaking and closing the circuit) being in each thermometric device different from that of the others, the action of any one of the aforesaid devices will, through an annunciating device, or other indicating device, give a signal corresponding to that primarily given by the thermometrical device which, for the time being, may be in operation, the circuit after the complete giving of such signal being automatically closed. From this it will be seen that the operation of any one of the thermometrical devices will indicate the locality thereof, and consequently of the fire or undue elevation of temperature; also, that after a signal is given from any one of the thermometric devices, the automatic closing of the circuit brings the apparatus back to its normal condition, to permit the subsequent operation of any of the other thermometric devices, to give their respective signals on the occurrence of undue heat; also, that the circuit being normally closed, except when broken in signaling, any injury, accidental or designed, to the wire will be made manifest by the action ended in the annunciator, or its equivalent from the breaking of the circuit.

The arrangement of the thermometric devices along the wire is shown in Fig. 4, the said devices being indicated by the word "detector," the wire by the letter J, the battery by Y, and the annunciating device by Z. It is to be expressly understood that, as concerns the principle of my invention, I do not limit myself to the precise mechanical appliances herein described. For example: although the thermometric devices constructed as herein set forth is preferred, any others acting by expansion to break the circuit through the normally-closed circuit may be used, so long as a series or system of such devices is employed to give signals from different localities along the wire to an annunciating device or indicating apparatus central or common to all of the thermometric devices along the wire.

So, also, the escapement-wheel and its adjuncts may be substituted by any other clock-work suitable for the purpose. So, also the theometric devices may be connected with a normally-closed circuit arranged in the usual or any appropriate way with reference to the stations of a district-alarm telegraph, so called. So, also, my invention may be used in connection with automatic signal instruments of any approved construction adapted in their operation to form part of, or act in connection with, the closed circuit of such district-telegraph. So, also, in the mechanical appliances adopted for controlling the movement of the parts set in motion by each thermometric device constructed as herein described, the stop and arm may be substituted by a stud projecting above the expansion-plate, and serving to limit the movement of the arbor as the index-finger comes in contact with the said stud. A shoulder or holding device may also, if preferred, be provided upon the upper surface of the expansion-plate in such relation with the index-finger as to hold the latter when the escapement is wound up and the alarm mechanism set until the bulging or expansion of the plate shall release the same and permit the making of the signal. It will be noticed that the arbor, being furnished with the knob or button, is readily turned to wind up the spring as required in setting the escapement for its work. It will furthermore be understood by those skilled in telegraphy that any of the known means of communication between the detector (the thermometrical device and its essential adjuncts) and an annunciating device may be used to indicate locality. I, therefore, do not confine myself to the particular means herein specifically set forth. Moreover, the apparatus deprived of the thermometrical device may be used for other signalling than that of a fire-alarm; for instance, a movement for any number of times given by other agencies to the lever, or a mechanical equivalent therefor, would transmit the same indication of locality to the annunciating device. On the other hand, the mechanism used in immediate connection with the disk can be employed without the electric circuit for sounding an alarm at the locality of the instrument itself.

What I claim as my invention is—

1. A disk or plate, B, combined with a stud, D, and with a mechanism made adjustable, as described, so as to set the apparatus to be self-operating at different degrees of temperature for breaking and making an electric circuit, so that the expansion or contraction of the said plate or disk to a certain predetermined extent will, through the said cause, disengage the mechanism to allow the breaking or making of the circuit.

2. In combination with the cam-shaped stud D, arranged to be revolved, I claim the lever E, and the escapement G and H, so that by the turning of the said stud, the lever F will be held or released, substantially as and for the purpose described.

3. The combination of the disk or plate B, stud D, and lever E and F with the escapement G and H, so that by the expanding of the said disk the lever E is disconnected from the lever F, leaving the said lever F free to be vibrated by the said escapement, substantially as set forth.

4. In combination with the subject-matter of the next preceeding clause of claim, I claim the pointer S in connection with the said stud D, for indicating the required degree for expansion or contraction, and the pointer B for indicating the locality, substantially as set forth.

WILLIAM GATES.

Witnesses:
SYLVANUS BUTLER,
A. E. BABCOCK.